United States Patent Office 3,026,218

Patented Mar. 20, 1962

3,026,218

PROCEDURE FOR FORMING PHOTOSENSITIVE LEAD SULFIDE LAYERS BY VACUUM EVAPORATION

John V. Morgan, Rochester, N.Y., assignor to Eastman Kodak Company, Rochester, N.Y., a corporation of New Jersey No Drawing. Filed Dec. 21, 1956, Ser. No. 630,005
7 Claims. (Cl. 117—201)

This invention relates to photoconductive cells. In one of its aspects this invention relates to infra-red sensitive lead selenide photoconductive cells. Another aspect of this invention relates to infra-red sensitive lead sulfide photoconductive cells.

The photosensitivity of lead selenide and lead sulfide has been known for some time and crystalline lead selenide and lead sulfide surfaces have been prepared by two methods generally referred to as chemical deposition and vacuum evaporation respectively. Cells prepared by both procedures have been used for the past several years.

Photoconductive cells containing layers of lead selenide or lead sulfide have been prepared by vacuum evaporation procedures using an evacuated glass envelope. A suitable procedure for preparing photoconductive cells in this manner is described in U.S. 2,448,516. In order to prepare a photoconductive cell in this manner, several milligrams of lead selenide or lead sulfide are placed inside a glass envelope that has previously been prepared with painted graphite electrodes at the area where the photosensitive layer is to be deposited. The glass envelope is evacuated to a pressure of about $10^{-5}$ mms. of mercury and the glass envelope is then heated either by direct application of a flame to the walls of the envelope or by electric heating until evaporation of the lead selenide or lead sulfide proceeds. By measuring the resistance across the electrode gap, the build-up of thickness of the layer of lead sulfide or lead selenide being evaporated can be monitored. The deposited layer is usually of the order of 0.1 micron in thickness. Sensitization of the deposited layer can then be effected by admitting oxygen to the glass envelope at a subatmospheric pressure and then heating the layer for a given period of time.

If desired, sensitization of the layer of lead selenide or lead sulfide can be effected during the evaporation and deposition procedure. Sensitization in this manner can be carried out by permitting oxygen or air to enter the evacuated glass envelope while the lead selenide or lead sulfide is being heated and evaporated for deposition into the desired layer. When a controlled leak of oxygen is used in this manner, the pressure in the evacuated envelope is of the order of $10^{-1}$ mm. of mercury. After deposition and sensitization of the desired layer, the evacuated glass envelope is sealed off and the fabrication of the photoconductive cell or tube is completed.

Evaporation procedures can be employed to prepare a thin layer of lead selenide or lead sulfide on a flat glass plate. The plates so prepared are cut to the desired size, fitted with electrodes and mounted in a suitable base to form the desired photoconductive cell. In preparing the necessary photosensitive layers, lead selenide or lead sulfide is evaporated by heating at a reduced pressure such as a pressure of the order of 100 microns. Evaporation is effected in such a way that the lead selenide or lead sulfide is deposited onto a glass plate. The resulting layer can be sensitized in the manner described above by contacting the deposited layer with a stream of oxygen or air either during or subsequent to the evaporation and deposition. These sensitized layers of lead sulfide or lead selenide are subject to undesirable or ruinous changes in their electrical properties when exposed to the atmosphere, and it has been found desirable to protect such layers in a suitable manner prior to exposure to the atmosphere.

In accordance with this invention, it has been found that the responsivity of lead selenide or lead sulfide layers can be substantially improved by adding either iodine or lead iodide to the lead selenide or lead sulfide prior to its evaporation and deposition as a photosensitive layer. The iodine or lead iodide can be added to the lead selenide or lead sulfide itself. However, it has been found preferable to prepare the lead selenide or lead sulfide by a fusion process, and the iodine or lead iodide is added to the lead selenide or lead sulfide during the fusion procedure.

The lead selenide or lead sulfide that is used to practice this invention can be obtained from natural sources or the selenide or sulfide can be prepared synthetically. The preferred procedure for synthetic preparation is a fusion procedure wherein lead is thoroughly mixed with a suitable amount of selenium or sulfur. The intimate mixture is then heated to its ignition temperature to initiate the reaction which begins and progresses through the mixture. The lead unites with the selenium or sulfur to form the desired selenide or sulfide for use in the process. As indicated above, the iodine or lead iodide is preferably added to the mixture of lead and selenium or sulfur prior to the fusion step.

The lead selenide or lead sulfide containing either iodine or lead iodide is then employed to form photosensitive layers in the manner described above. Sensitization of these layers with oxygen or air can be effected either during evaporation and deposition of the lead selenide or lead sulfide or alternatively the sensitization can be effected by subsequent contacting of the deposited layer with air or oxygen at a subatmospheric pressure.

The maximum amount of iodine or equivalent weight of lead iodide that will produce an improved responsivity is about 1% of the weight of the lead used in lead selenide or lead sulfide. The minimum amount of iodine or eqiuivalent weight of lead iodide is of the order of 0.003% of the weight of the lead.

In practicing this invention it has been found possible to increase the average responsivity of lead selenide and lead sulfide cells by at least 75 percent. The following examples demonstrate the outstanding improvement in responsivity of the photoconductive layers obtainable by practicing this invention. In these examples lead selenide and lead sulfide layers were prepared by an evaporation procedure in the manner described above, and for comparative purposes similar layers were prepared in accordance with this invention by incorporation of either iodine or lead iodine. The responsivity of the layers was determined in microvolts per microwatt (500 Kelvin blackbody) with 22.5 volts across the cell and matching ballast resistor.

*Example I*

The average responsivity of 28 layers of lead selenide was 3.5. The average responsivity of 33 layers of lead selenide containing either iodine or lead iodide was 6.3 representing an improvement of 80 percent.

*Example II*

The average responsivity of 15 layers of lead sulfide was 44. The average responsivity of 8 layers of lead sulfide containing either iodine or lead iodide was 97 representing an improvement of 112 percent.

I claim:

1. In the process for preparing photoconductive layers of lead sulfide wherein said lead sulfide is evaporated by heating at a subatmospheric pressure and deposited on a surface, the improvement which comprises adding to said lead sulfide prior to evaporation thereof an additive selected from the group consisting of iodine and lead iodide in an amount within the range of 0.003% to 1% of the weight of lead in said lead sulfide to improve the responsivity of the deposited layer.

2. The improvement according to claim 1 wherein the additive is incorporated in the lead sulfide during its formation by fusion of lead with sulfur.

3. The improvement according to claim 1 wherein iodine is the additive.

4. The improvement according to claim 1 wherein lead iodide is the additive.

5. The improvement according to claim 1 wherein the lead sulfide containing additive is evaporated and deposited on a glass plate.

6. The improvement according to claim 1 wherein the lead sulfide containing additive is evaporated and deposited on a surface in an oxygen atmosphere.

7. A photoconductive layer of lead sulfide deposited on a substrate and containing an additive selected from the group consisting of iodine and lead iodide in an amount within the range of 0.003%–1% by weight of lead in said lead sulfide.

References Cited in the file of this patent

UNITED STATES PATENTS

| | | |
|---|---|---|
| 1,730,505 | Hart | Oct. 8, 1929 |
| 2,448,516 | Cashman | Sept. 7, 1948 |

OTHER REFERENCES

Humphrey: Photoconductivity in Lead Selenide, Ph.D. Thesis, Univ. of Maryland, 1955, publication No. 14,200, University Microfilms, 313 North First St., Ann Arbor, Mich., November 1955, 105 pages (Microfilm $1.31).